United States Patent [19]

Ziv et al.

[11] Patent Number: 5,061,834
[45] Date of Patent: Oct. 29, 1991

[54] END EFFECTOR FOR TRANSLATING IN A CARTESIAN COORDINATE SYSTEM

[75] Inventors: Reffael Ziv; Omer Finav, both of Tel Aviv, Israel

[73] Assignee: Robomatix Ltd., Petach Tikva, Israel

[21] Appl. No.: 554,518

[22] Filed: Jul. 20, 1990

Related U.S. Application Data

[63] Continuation-in-part of Ser. No. 541,975, Jun. 22, 1990.

[51] Int. Cl.5 .............................................. B23K 26/02
[52] U.S. Cl. ........................... 219/121.78; 219/121.67; 219/121.74
[58] Field of Search ....................... 219/121.78, 121.79, 219/121.74, 121.75, 121.63, 121.64, 121.67, 121.72

[56] References Cited

U.S. PATENT DOCUMENTS 4,618,758 10/1986 Gilli et al. ...................... 219/121.67
4,707,596 11/1987 Hohberg .............................. 250/201

*Primary Examiner*—C. L. Albritton
*Attorney, Agent, or Firm*—Cushman, Darby & Cushman

[57] ABSTRACT

An end effecter is disclosed which translates in a cartesian coordinate system including a first axis and a second axis perpendicular to the first axis. The end effecter includes apparatus for receiving a laser beam from an articulated optical delivery system and for transmitting it along the first and the second axes and translating apparatus for translating the apparatus for receiving and for transmitting along the first and the second axes. Also disclosed is a method for cutting utilizing the end effecter.

11 Claims, 4 Drawing Sheets

1

END EFFECTOR FOR TRANSLATING IN A CARTESIAN COORDINATE SYSTEM

This application is a continuation-in-part of application Ser. No. 541,975 filed June 22, 1990, now U.S. Pat. No. 5,038,015.

FIELD OF THE INVENTION

The present invention relates to apparatus which performs motion in a cartesian coordinate system generally and to robot end effecters performing motion in a cartesian coordinate system in particular.

BACKGROUND OF THE INVENTION

Tables which perform motion in a cartesian coordinate system, x-y tables, are known in the art. They are typically used in robotic cutting systems to produce cuts in a cartesian coordinate system.

In a x-y table system, a workpiece is placed on the x-y table and the table is moved while a fixed cutting head of the robot cuts the workpiece. Typically, the fixed cutting head is located perpendicular to the x-y table and the cutting is performed a plane parallel to the x-y table.

Unfortunately, x-y tables are fixed in space when they are installed in a cutting system. Typically they are installed in a horizontal direction. Thus, workpieces which require cartesian plane cuts on non-horizontal surfaces must use some other mechanism to produce the cuts.

Typically, the other mechanism used for cutting on non-horizontal surfaces, or on large workpieces, is a rotating end effector, such as a cutting or focusing head, attached to a movable robot. A typical cutting head is described in U.S. Pat. No. 4,618,758. The movable robot moves the cutting head around the workpiece and the cutting head creates a curved cut. As is known in the art, it is not possible to create a perfectly straight cut with a rotating cutting head.

SUMMARY OF THE INVENTION

It is therefore, an object of the present invention to provide an end effector for producing motion in a cartesian coordinate system.

There is therefore provided, in accordance with a preferred embodiment of the present invention, an end effector for translating in a cartesian coordinate system including a first axis and a second axis perpendicular to the first axis including apparatus for receiving a laser beam from an articulated optical delivery system and for transmitting it along the first and the second axes and translating apparatus for translating the apparatus for receiving and for transmitting along the first and the second axes.

Additionally, in accordance with a preferred embodiment of the present invention, the apparatus for receiving and transmitting include two or three mirrors.

Moreover, in accordance with a preferred embodiment of the present invention, the end effector also includes follower apparatus for receiving the laser beam along the second axis and for transmitting it along a third axis. The follower apparatus preferably includes a lens.

There is additionally provided, in accordance with a preferred embodiment of the present invention, a laser system including an articulated optical delivery system for delivering a laser beam and an end effector for translating in a cartesian coordinate system which includes a first axis and a second axis perpendicular to the first axis. The end effector preferably includes apparatus for receiving the laser beam from the articulated optical delivery system and for transmitting it along the first and the second axes and translating apparatus for translating the apparatus for receiving and for transmitting along the first and the second axes.

Furthermore, in accordance with a preferred embodiment of the present invention, the laser system includes follower apparatus for receiving the laser beam along the second axis and for transmitting it along a third axis.

Moreover, in accordance with a preferred embodiment of the present invention, the articulated optical delivery system comprises apparatus for bringing the end effector to the workpieces such that the third axis is perpendicular to a surface of the workpiece.

Further, in accordance with a preferred embodiment of the present invention, the apparatus for bringing the end effector to the workpiece includes apparatus for rotating the end effecter.

Still further, in accordance with an alternative embodiment of the present invention, the articulated optical delivery system includes a multiplicity of rotary axes wherein the first axis of the end effector is coincident with one of the rotary axes. The articulated optical delivery system comprises a mirror for rotation about two axes and the end effecter is connected to the mirror.

Finally, there is provided, in accordance with a preferred embodiment of the present invention, a method of cutting lines and curves in a cartesian plane including the steps of using an articulated optical delivery system to bring an end effecter perpendicular to a surface of a workpiece to be cut, transmitting a laser beam from the articulated optical delivery system to the end effecter, receiving the laser beam from the articulated optical delivery system and transmitting it, via apparatus for transmitting the laser beam, along first and second axes of the end effector, translating the apparatus for transmitting the laser beam along the first and the second axes and simultaneously performing the steps of transmitting, receiving and translating thereby to produce cuts in the workpiece definable in a cartesian coordinate system.

BRIEF DESCRIPTION OF THE DRAWING

The present invention will be understood and appreciated more fully from the following detailed description taken in conjunction with the drawings in which.

DETAILED DESCRIPTION OF THE PRESENT INVENTION

Figure 1:
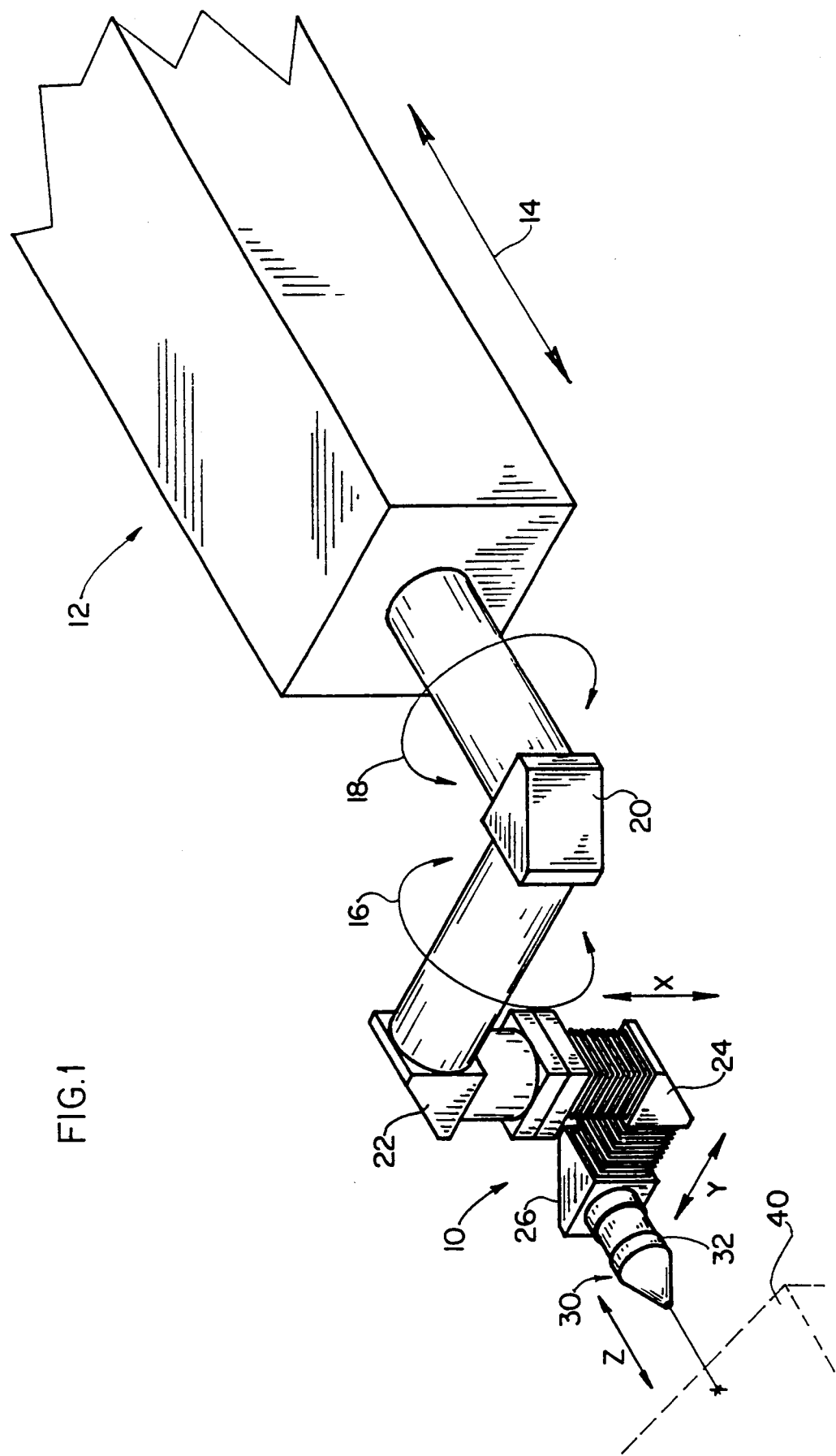
FIG. 1 is a schematic illustration of a robotic system with an end effector for performing motion in a cartesian coordinate system constructed and operative in accordance with a preferred embodiment of the present invention.

Reference is now made to FIG. 1 which illustrates an end effector 10 of the present invention constructed and operative in conjunction with an optical delivery system 12, such as a laser robot.

The optical delivery system 12 includes at least two mirrors 20 and 22 for bending a laser beam (not shown) towards and into the end effector 10. End effector 10 typically comprises two mirrors 24 and 26 for bending the laser beam towards a follower 30. Assuming a cartesian coordinate system (x-y-z) whose origin is at the center of mirror 24, end effector 10 receives the laser beam along an x axis at which point mirror 24 reflects it along a y axis towards mirror 26. From mirror 26 the laser beam enters follower 30 where it typically is focussed by a lens 32.

As noted by the arrows marked X and Y, mirror 24 translates along the x axis towards and away from mirror 22. Likewise, mirror 26 translates along the y axis towards and away from mirror 24. Lens 32 is typically translated along the z axis and is operative to focus the laser beam on a workpiece 40. Thus, the optical delivery system 12 has to be such that it can bring the z axis to a perpendicular position with respect to a surface of the workpiece 40.

In order to bring the end effector 10 to any desired location and orientation in space, the optical delivery system 12 typically has at least three degrees of freedom. The example optical delivery system 12 shown in FIG. 1 has a translating axis, marked by arrow 14, and two rotating axes, marked by arrows 16 and 18. It will be appreciated that an optical delivery system 12 can have fewer or more degrees of freedom, as desired.

Since there is no rotary motion of mirrors 24 and 26, the end effector 10 only performs translation in the x-y directions. It will be appreciated that, due to the location of the end effector 10 at the end of the optical delivery system 12, the x-y motion can be performed anywhere in space. Additionally, in contrast to the prior art x-y tables, the x-y motion is performed in conjunction with the delivery of the laser beam.

Figure 2A:
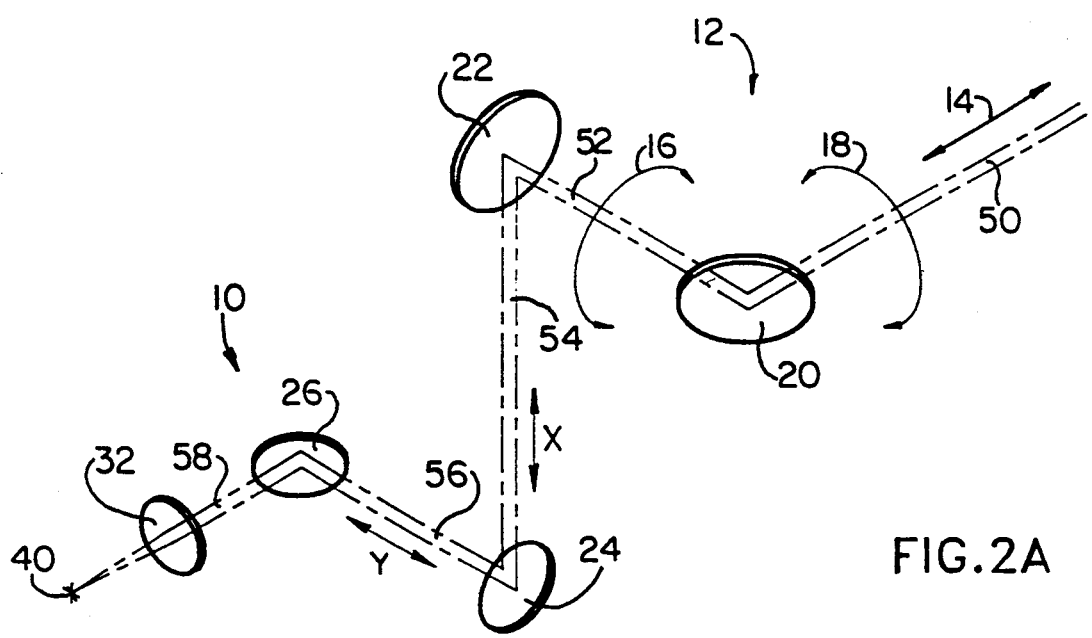
FIGS. 2A and 2B are schematic illustrations of the path of a laser beam to and through the x-y end effecter of FIG. 1.
Figure 2B:
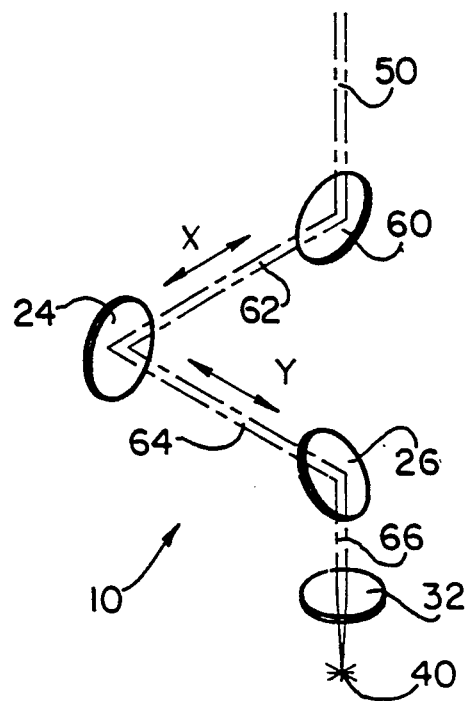

Reference is now made to FIGS. 2A and 2B which illustrate the path of a laser beam 50 through the optical delivery system 12 and through the end effector 10. In FIG. 2A, laser beam 50 is received and reflected by mirror 20, a rotatable and translatable mirror. From mirror 20, laser beam 50 travels, as beam 52, to mirror 22, a rotatable mirror. Mirror 22 delivers laser beam 54, the reflection of laser beam 52 along an x axis from mirror 22, to mirror 24, a translatable mirror. Mirror 26, a translatable mirror, receives a laser beam 56, the reflection of laser beam 54 along a y axis from mirror 24, and reflects it, as beam 58 towards and through lens 32 which focuses it onto the workpiece 40, shown schematically as an asterisk.

An alternative embodiment of the present invention, typically for use with optical delivery systems 10 which produce a laser beam 50 in a vertical direction, includes an orientating mirror 60 for reflecting laser beam 50, as laser beam 62, along an horizontal x direction. Mirror 24, a translatable mirror, reflects laser beam 62, as laser beam 64, along an horizontal y axis towards mirror 26. Laser beam 64 is reflected, as laser beam 66, towards and through lens 32 where it is focused onto workpiece 40.

Figure 3:
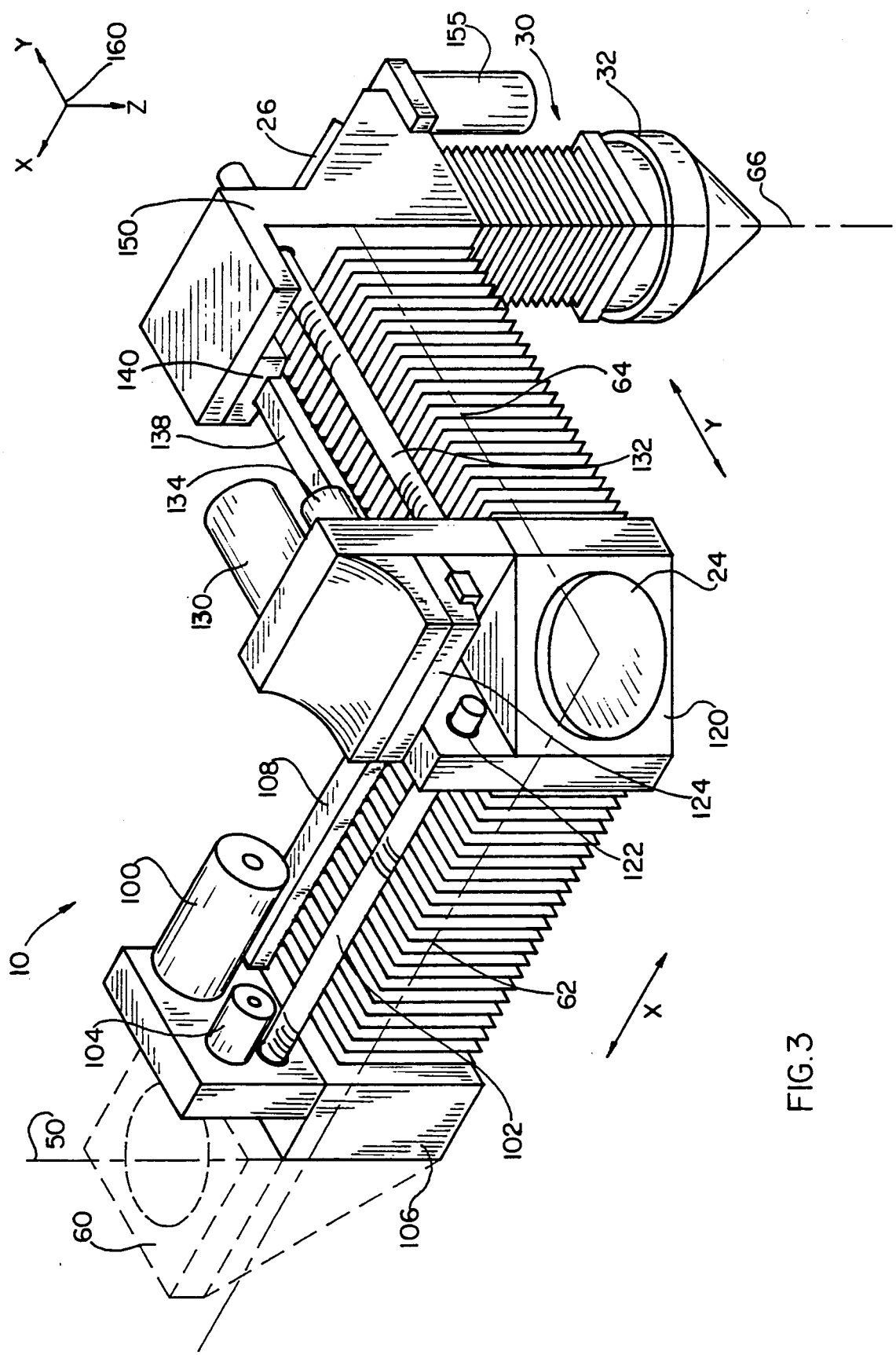
FIG. 3 is an isometric and schematic illustration of the x-y end effector of FIG. 1.

Reference is now made to FIG. 3 which details the elements of the end effector 10 of the present invention. Orienting mirror 60 is shown with dashed lines to indicate that it is an optional element.

To produce accurate x axis motion, an x translation system is used, comprising a motor 100, such as a DC motor, a ball screw 102 and a digital encoder 104 operated together with a timing belt (not shown). As is known in the art, the encoder 104 is necessary for control purposes. A linear rail 108, such as the 1607-101-31 by Star of West Germany, is also employed to ensure that the motion produced by the motor 100 and the ball screw 102 is only translatory.

Motor 100, ball screw 102, encoder 104 and linear rail 108 are attached to a first housing 106 to which is also attached to optional orienting mirror 60. Optional orienting mirror 60 is attached to housing 106 so as to reflect beam 50 along the x axis.

A second housing 120, to which is attached mirror 24, includes a ball screw nut 122 in which ball screw 102 rotates and a linear bushing 124, such as the 1604-131-10 by Star, slides along linear rail 108. Thus, upon operation of motor 100, second housing 120 translates along the x axis, moving mirror 24 towards or away from first housing 106 and from optional orienting mirror 60. It will be appreciated that mirror 24 is oriented at 45° to both the x and y axes so as to reflect beam 62 from the x axis to the y axis.

Also attached to second housing 120 is a y translation system, similar to the x translation system and comprising a motor 130, a ball screw 132, a digital encoder 134, a timing belt (not shown), and a linear rail 138. A linear bushing 140, housed in a third housing 150 to which is also attached mirror 26, slides along linear rail 138. Upon operation of motor 130, third housing translates along the y axis thereby moving mirror 26 towards or away from mirror 24.

It will be appreciated that mirror 26 is oriented at a 45° to both the y and z axes so as to reflect beam 64 towards the z axis and into follower 30.

Follower 30 is operated via a motor 155, such as a DC motor, and a transmission apparatus (not shown), such as a timing belt or a rack and pinion, and is operative to move short distances, such as 20 mm. End effector 10, on the other hand, is operative to translate over typically a square of 60×60 mm.

It will be appreciated that the optical delivery system 12 is operative to bring end effector 10 to a desired position in space close to the workpiece 40 and end effector 10 is operative to translate follower 30 around the desired position along any desired path in the x-y plane of the cartesian coordinate system. Such a path might be a collection of straight lines, such as a parallelogram, or a curve. It is a feature of the present invention that, while moving the follower 30 around the desired position, the end effector 10 delivers the laser beam 66 to the workpiece 40 thereby to effect straight line and curved cuts without having to move the workpiece 40. To that end, the housings 106, 120 and 150 include both optical and mechanical elements so as to provide a compact, lightweight and rigid end effector 10.

Figure 4:
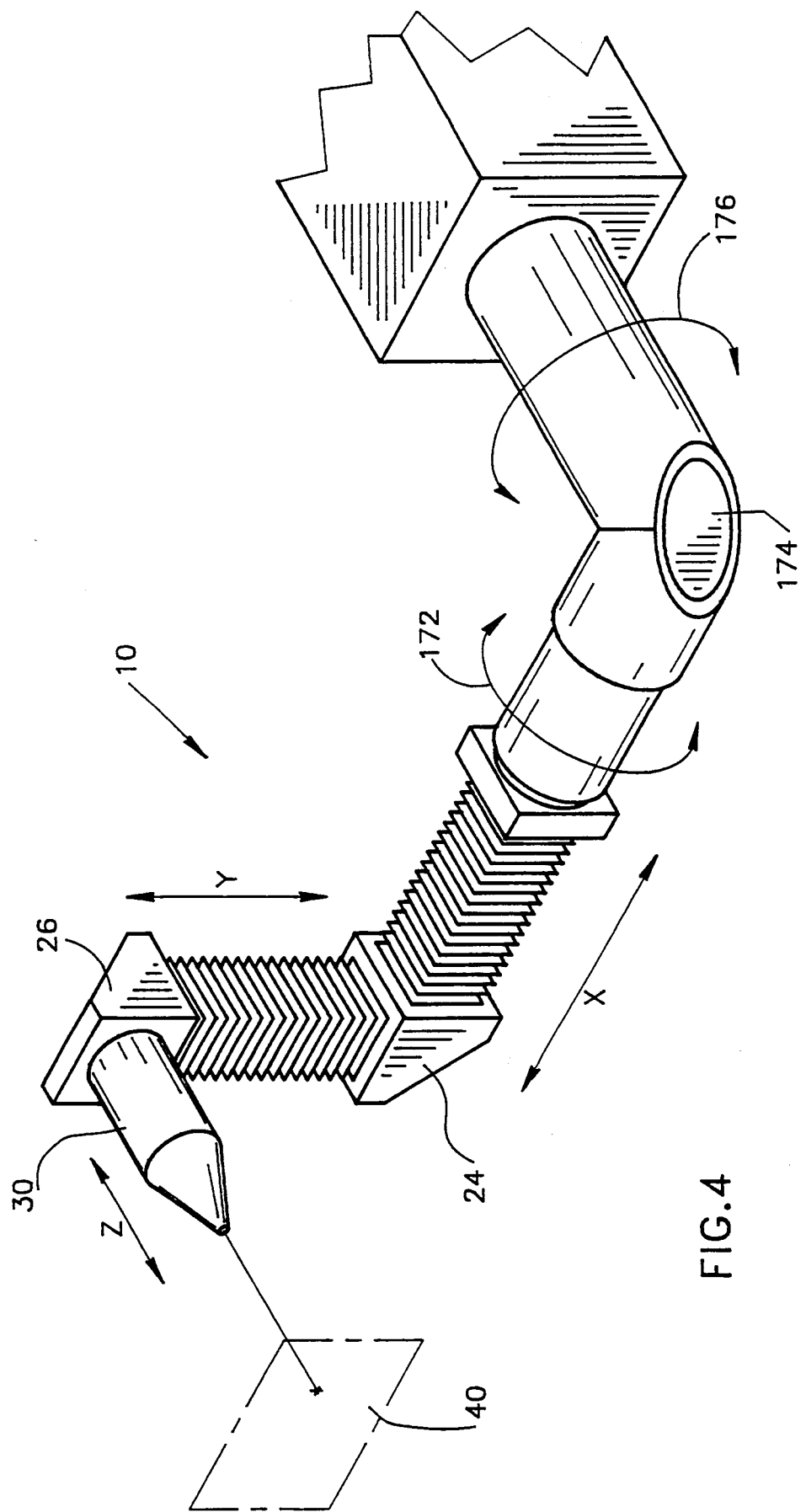
FIG. 4 is a schematic illustration of an alternative embodiment of the robotic system of FIG. 1.

Reference is now made to FIG. 4 which illustrates a portion of a laser system wherein end effector 10 is directly attached to a rotary axis 172 of an optical delivery system, marked 170. Specifically, the x linear axis is a continuation of the rotary axis 172.

In this embodiment, a single mirror 174 is operative to receive a laser beam (not shown) along a first rotary axis 176 and to deliver the laser beam along rotary axis 172. Mirror 24 of the end effector 10 receives the laser beam and delivers it, as in the previous embodiments, to mirror 26 which bends the laser beam through follower 30 to impinge upon workpiece 40.

It will be appreciated that the laser system of FIG. 4 comprises one less mirror than the end effecter and optical delivery system combination shown in FIG. 1 while still producing motion in five axes. Specifically, the five axes are the two rotary axes 172 and 176 and the three translatory axes x, y and z. The combination of FIG. 4 is advantageous in that it utilizes one less mirror while still maintaining the ability to bring the end effecter 10 to any desired orientation.

It will be appreciated by persons skilled in the art that the present invention is not limited to what has been particularly shown and described hereinabove. Rather the scope of the present invention is defined only by the claims which follow:

We claim:

1. An end effecter suitable for attachment to a robot as the final mechanical positioner therefor for translating in a cartesian coordinate system comprising a first axis and a second axis perpendicular to said first axis comprising:
   means for receiving a laser beam from an articulated optical delivery system and for transmitting it along said first and said second axes; and
   translating means for translating said means for receiving and for transmitting along said first and said second axes without rotation about said first and second axes.

2. An end effecter according to claim 1 wherein said means for receiving and transmitting include two mirrors.

3. An end effecter according to claim 1 wherein said means for receiving and transmitting include three mirrors.

4. An end effecter according to claim 1 and also including follower means for receiving said laser beam along said second axis for transmitting it along a third axis.

5. An end effecter according to claim 4 wherein said follower means includes a lens.

6. A laser robot comprising:
   an articulated optical delivery system for delivering a laser beam;
   an end effecter for translating in a cartesian coordinate system comprising a first axis and a second axis perpendicular to said first axis comprising:
      means for receiving said laser beam from said articulated optical delivery system and for transmitting it along said first and said second axes; and
      translating means for translating said means for receiving and for transmitting along said first and said second axes without rotation about said first and second axes.

7. A laser system according to claim 6 and also including follower means for receiving said laser beam along said second axis and for transmitting it along a third axis.

8. A laser system according to claim 6 wherein said articulated optical delivery system comprises means for bringing said end effecter to said workpiece such that said third axis is perpendicular to a surface of the workpiece.

9. A laser system according to claim 8 wherein said means for bringing said end effecter to said workpiece include means for rotating said end effecter.

10. A laser system according to claim 6 wherein said articulated optical delivery system includes a multiplicity of rotary axes wherein said first axis is coincident with one of said rotary axes.

11. A laser system according to claim 6 wherein said articulated optical delivery system comprises a mirror for rotation about two axes and wherein said end effecter is connected to said mirror.

* * * * *